United States Patent Office 2,875,195
Patented Feb. 24, 1959

2,875,195
METHOD OF SOLUBILIZING VITAMINS A, $B_2$, $D_2$ AND E

Wilbert J. Humphlett and Charles V. Wilson, Rochester, N. Y., assignors to Eastman Kodak Company, Rochester, N. Y., a corporation of New Jersey No Drawing. Application August 9, 1956
Serial No. 603,193

16 Claims. (Cl. 260—211.3)

This invention relates to new compositions of matter obtained from water-insoluble vitamins and more particularly to water-soluble vitamins and their method of production.

Vitamins have assumed an ever-increasing importance in medical treatment and their value to the human system is well known. However, it has long been desired to find some way of making these materials water-soluble so they would be more easily absorbed by the human body. Various ways are known in the prior art of solubilizing complex molecules, but, for the most part, these have been unsuitable since it has also been necessary that these materials, once they were made water-soluble, would be non-toxic and the solubilizing groups would be acceptable to the human system.

We have found a method of solubilizing vitamins which are normally water insoluble. When taken internally the normal hydrolytic cleavage of these solubilized vitamins results in amino acids which are acceptable to the human system and are themselves beneficial.

One object of this invention is to provide water-soluble vitamins. Another object is to provide a method of solubilizing vitamins so that they may be taken orally. A further object is to provide a non-toxic water-soluble vitamin.

The above objects are obtained by reacting water-insoluble vitamins with an isocyanato ester and then hydrolyzing with a suitable basic material. Our preferred embodiment is to use an isocyanato ester derived from glutamic or aspartic acid, but adequate solubility is frequently attained with the isocyanato esters from the simpler amino acids such as glycine, α-alanine, leucine, and the like.

Suitable basic materials include the hydroxides and carbonates of sodium, potassium and lithium, alkyl primary, secondary and tertiary amines, and the like.

The following general equation illustrates the type of reactions involved:

ROH+OCNCHR'COOR''→ROCONHCHR'COOR''→
ROCONHCHR'COONa

R represents the vitamin radical or the vitamin molecule less the hydroxyl group. R' may be H, alkyl such as $CH_3$, $C_2H_5$, and $(CH_3)_2CH$, $(CH_2)_n$ in which $n$ is a whole integer from 1–6 or aryl such as $C_6H_5$, $CH_2COOR''$, and $CH_2CH_2COOR''$. R'' may be $CH_3$, $C_2H_5$ or some other lower alkyl.

Although the equation shown indicates that the isocyanate is derived from the esters of α-amino acids, isocyanato esters of the structure $OCN(CH_2)_nCOOR''$ or $CH_3(CH_2)_mCH(NCO)(CH_2)_nCOOR''$ in which $n$ is a whole integer from 1 to 6 and $m$ is a whole integer from 1 to 6, for example, may also be employed. Isocyanato esters such as those derived from p-aminophenylacetic or p-aminophenylsuccinic acids also fall within the scope of our invention.

The following examples are intended to illustrate our invention but are not intended to limit it in any way:

*Example 1.—Reaction of vitamin A with dimethyl α-isocyanatoglutarate*

Vitamin A reacted with dimethyl α-isocyanatoglutarate to form 2-[3,7-dimethyl-9-(2,6,6-trimethyl-1-cyclohexen-1-yl)-2,4,6,8-nonatetraenylcarbamato] glutaric acid (sodium salt) according to the following:

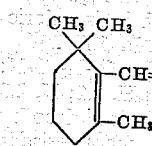 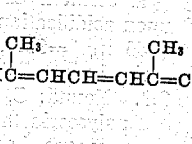 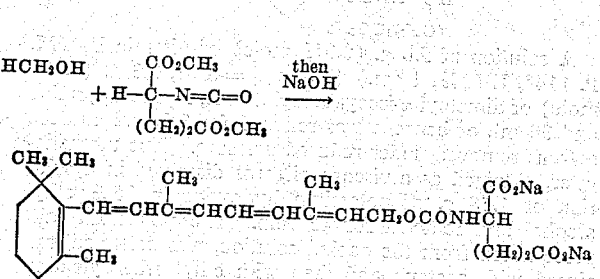

A solution was prepared of 3.33 g. (0.012 mole) of crystalline vitamin A alcohol (M. P. 63–64°) E (1%, 1 cm.) (325 mμ)=1820, 2.09 g. (0.01 mole) of dimethyl α-isocyanatoglutarate (B. P. 83° at 0.5 mm., $n_D^{25}$ 1.4446), 1.8 ml. of anhydrous pyridine and 23 ml. of anhydrous benzene in a 50 ml. amber flask. The solution was refluxed for 1 hour 35 min. protected from atmospheric moisture by a calcium chloride tube. After removal of the solvent in vacuo, the corresponding urethane-ester was obtained as a viscous oil, E (1%, 1 cm.) (325 mμ)=990 and having a characteristic carotenoid spectrum in the infrared. To a solution of the ester in 95% ethyl alcohol was added 0.9 g. of sodium hydroxide pellets dissolved in 20 ml. of alcohol and the reaction mixture swirled at room temperature for 30 min. The resulting sodium salt was collected and washed with ethyl alcohol and then ethyl ether yielding 4.17 g. (83% of theory) of a yellow, free-flowing powder, E (1%, 1 cm.) (325 mμ)=885, M. P. 360° and having a characteristic carotenoid infrared spectrum.

The solubility of this product was demonstrated by dissolving 2.0 g. of the sodium salt in 5.0 ml. of water giving a yellow, homogeneous and clear solution.

A solution of the salt yielded the corresponding acid upon addition of dilute hydrochloric acid, E (1%, 1 cm.) (325 mμ)=765, M. P. 80°.

*Analysis.*—Calc'd for $C_{26}H_{37}O_6N$: C, 67.9; H, 8.1; N, 3.0. Found: C, 67.7; H, 8.3; N, 2.9.

All analyses in the ultraviolet spectrum employ solutions prepared in ethyl alcohol.

*Example 2.—Reaction of vitamin A with dimethyl α-isocyanatosuccinate*

By a method identical to that described above, employment of dimethyl α-isocyanatosuccinate (B. P. 65° at 0.5 mm., $n_D^{25}$ 1.4455) in a reaction with crystalline vitamin A also yielded a water-soluble product, E (1%, 1 cm.) (325 mμ)=815, M. P. 310°.

Example 3.—Reaction of vitamin $D_2$ (calciferol) with dimethyl α-isocyanatoglutarate Vitamin $D_2$ (calciferol) reacted with dimethyl α-isocyanatoglutarate and saponified as follows:

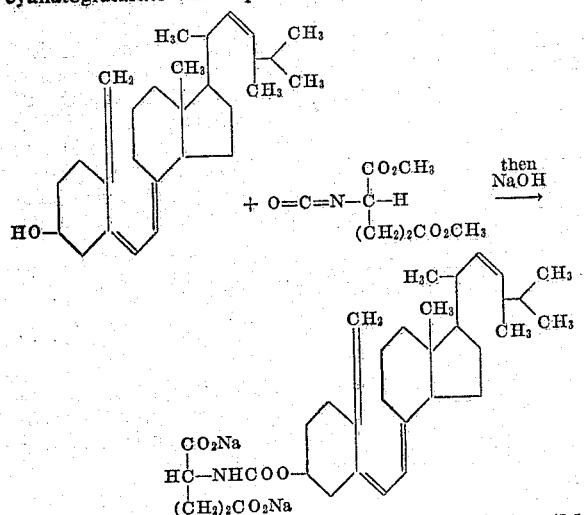

A solution of 5.0 g. (0.013 mole) of vitamin $D_2$ (M. P. 114°, E (1%, 1 cm.) (263 mμ)=467), 2.3 g. (0.011 mole) of dimethyl α-isocyanatoglutarate, 5 ml. of pyridine and 30 ml. of benzene was refluxed for 2 hours and the solvent removed under reduced pressure. The urethane-ester, obtained as a viscous oil, was dissolved in a solution of 1.58 g. of potassium hydroxide in 95% ethyl alcohol and refluxed for 45 min. The potassium salt, precipitated from the cooled solution, was collected and rinsed with acetone and then with ethyl ether yielding 6.2 g. (84%) of a white, free-flowing powder, M. P. 240°, E (1%, 1 cm.) (265 mμ)=208 in water solution. This product is readily soluble in water.

A water solution of the potassium salt was acidified with hydrochloric acid giving the corresponding acid, M. P. 83°, E (1%, 1 cm.) (263 mμ)=289.

Analysis.—Calc'd for $C_{34}H_{51}O_6N$: N, 2.5. Found: N, 2.4.

The sodium salt was prepared by dissolving the corresponding acid in an ethyl alcohol solution containing a slight excess of sodium hydroxide. This product, M. P. 318°, is soluble in water.

The ammonium salt was prepared by dissolving the corresponding acid in ethyl alcohol and adding an excess of concentrated ammonium hydroxide solution. Evaporation under reduced pressure left the solid ammonium derivative, M. P. 180°

$$E (1\%, 1 \text{ cm.}) (268 \text{ m}\mu)=210$$

in water solution. This product is readily soluble in water.

Example 4.—Reaction of vitamin E with dimethyl α-isocyanatoglutarate

Vitamin E, reacted with dimethyl α-isocyanatoglutarate to form α-tocopheryl-2-carbamatoglutaric acid (sodium salt) according to the following equation:

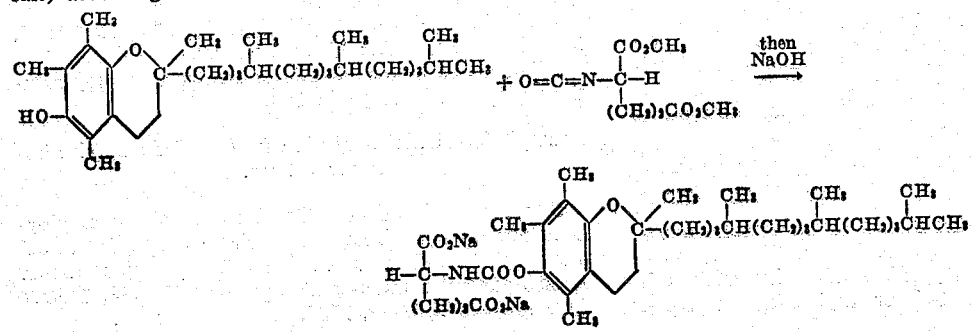

A solution of 40.6 g. (0.09 mole) of α-tocopherol (93.7% α-tocopherol, 95.5% total tocopherols), 16.1 g. (0.08 mole) of dimethyl α-isocyanatoglutarate and 200 ml. of anhydrous xylene was refluxed for 48 hours. After removal of the solvent under reduced pressure, the residual ester was obtained as an orange oil. The ester was saponified by warming with a solution of 7 g. of sodium hydroxide in 200 ml. of 90% alcohol for 45 min. The solid product was collected and washed with acetone yielding 35.8 g. (69.5%) of a tan powder.

For further purification the salt was dissolved in 150 ml. of water and the solution extracted with ether. The aqueous phase was separated, warmed with powdered charcoal and filtered. To this solution was added an excess of dilute hydrochloric acid and the precipitated solid acid product was collected and dried. The acid was dissolved in alcohol and the solution warmed with charcoal and filtered. To this solution was added a 5% excess of sodium hydroxide dissolved in alcohol. The precipitated product amounted to 22.1 g. (62%, recovery), E (1%, 1 cm.) (283 mμ)=24.2, M. P. 292°.

To demonstrate the solubility of this product, 1 g. of the salt was dissolved readily in 2 ml. of water.

A solution of the salt gave the corresponding acid upon acidification with hydrochloric acid, E (1%, 1 cm.) (283 mμ)=35.6, M. P. 107°.

Analysis.—Calc'd for $C_{35}H_{57}O_7N$: C, 69.7; H, 9.4; N, 2.3. Found: C, 70.2; H, 9.2; N, 2.3.

Analyses in the infrared of both the salt and the acid gave curves having characteristics of the vitamin E molecule.

Example 5.—Reaction of vitamin E with dimethyl α-isocyanatosuccinate

By a method identical to that in the foregoing example, 48.8 g. (0.11 mole) of α-tocopherol and 18.7 g. (0.10 mole) of dimethyl α-isocyanatosuccinate were reacted and subsequently saponified with 8.3 g. of sodium hydroxide yielding 41.3 g. (66%) of a water-soluble product, M. P. 234°.

The corresponding acid was prepared from the salt, E (1%, 1 cm.) (283 mμ)=32.7.

Analysis.—Calc'd for $C_{34}H_{55}O_7N$: C, 69.3; H, 9.4; N, 2.4. Found: C, 69.4; H, 9.4; N, 2.4.

Vitamins for the most part are characterized by certain steroidal and isoprenoidal configurations and are of particular value in dietary programs and are of value in medicine and nutrition. These water-soluble compounds are particularly adaptable to injection or oral administration. Due to their solubility, these derivatives promise to constitute therapeutic preparations more readily absorbed in metabolic processes than the parent substances which are not water soluble. They are also characterized by the fact that normal hydrolytic cleavage of the molecule will produce an amino acid which would have no detrimental effect upon the human system.

Our invention relates to vitamins which are insoluble or sparingly soluble in water and includes, vitamins A, $B_2$ (riboflavin), $D_2$ (calciferol), E, and the like.

We claim:
1. A composition of matter having the formula

$$R'OOCNH\underset{|}{\overset{R}{C}}H$$
$$(CH_2)_n COOR''$$

in which R is selected from the class consisting of alkyl groups having 1–3 carbon atoms, hydrogen, and COOR''; R' is a vitamin-oxy radical of a vitamin selected from the class consisting of vitamins A, $B_2$, $D_2$, and E; R'' is selected from the class consisting of Na, K, and Li; and n is a whole integer from 1–6.

2. A solubilized vitamin A having the following formula:

[structure of solubilized vitamin A with COONa and $(CH_2)_2CO_2Na$ groups]

3. A solubilized vitamin $D_2$ having the following formula:

[structure of solubilized vitamin $D_2$ with $CO_2Na$ and $(CH_2)_2CO_2Na$ groups]

4. A solubilized vitamin E having the following formula:

[structure of solubilized vitamin E with COONa and $(CH_2)_2CO_2Na$ groups]

5. A solubilized vitamin $B_2$ as follows:

[structure of solubilized vitamin $B_2$ with $CO_2Na$ and $(CH_2)_2CO_2Na$ groups]

6. A solubilized vitamin E as follows:

[structure of solubilized vitamin E with COOK and $CH_2COOK$ groups]

7. A process of solubilizing vitamin A comprising reacting it with an isocyanato ester having the following general formula:

$$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms and COOR and hydrolyzing the COOR group to form an alkali metal salt.

8. A process of solubilizing vitamin $B_2$ (riboflavin) comprising reacting it with an isocyanato ester having the following formula:

$$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms and COOR and hydrolyzing the COOR group to form an alkali metal salt.

9. A process of solubilizing vitamin $D_2$ (calciferol) comprising reacting it with an isocyanato ester having the following formula:

$$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms and COOR and hydrolyzing the COOR group to form an alkali metal salt.

10. A process of solubilizing vitamin E comprising reacting it with an isocyanato ester having the following formula:

$$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms and COOR and hydrolyzing the COOR group to form an alkali metal salt.

11. A process of solubilizing vitamins selected from the class consisting of vitamins A, $B_2$, $D_2$, and E by reacting the vitamins with an isocyanato ester having the following general formula:

$$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms and COOR hydrolyzing the COOR group to form an alkali metal salt.

12. A process of making an urethane of vitamin A comprising reacting it with an isocyanato ester having the following general formula $$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms, and COOR.

13. A process of making an urethane of vitamin $B_2$ (riboflavin) comprising reacting it with an isocyanato ester having the following general formula $$OCN-\underset{|}{\overset{R'}{C}}H$$
$$(CH_2)_n-COOR$$

in which R is an alkyl group having 1–4 carbon atoms, n is a whole integer of 1 to 6 and R' is selected from the class consisting of hydrogen, alkyl having 1–3 carbon atoms, and COOR.

14. A process of making an urethane of vitamin $D_2$ (calciferol) comprising reacting it with an isocyanato ester having the following general formula $$\begin{array}{c} R' \\ | \\ OCN-CH \\ | \\ (CH_2)_n-COOR \end{array}$$

in which R is an alkyl group having 1–4 carbon atoms, $n$ is a whole integer of 1 to 6 and R' is selected from the class consisting of hydrogen, alkyl having 1–3 carbon atoms, and COOR.

15. A process of making an urethane of vitamin E comprising reacting it with an isocyanato ester having the following general formula $$\begin{array}{c} R' \\ | \\ OCN-CH \\ | \\ (CH_2)_n-COOR \end{array}$$

in which R is an alkyl group having 1–4 carbon atoms, $n$ is a whole integer of 1 to 6 and R' is selected from the class consisting of hydrogen, alkyl having 1–3 carbon atoms, and COOR.

16. A process of making an urethane of vitamins selected from the class consisting of vitamins A, $B_2$, $D_2$, and E by reacting the vitamins with an isocyanato ester having the following general formula:

$$\begin{array}{c} R' \\ | \\ OCN-CH \\ | \\ (CH_2)_n-COOR \end{array}$$

in which R is an alkyl group having 1–4 carbon atoms, $n$ is a whole integer of 1 to 6 and R' is selected from the class consisting of hydrogen, alkyl having 1–3 carbon atoms, and COOR.

References Cited in the file of this patent
UNITED STATES PATENTS 2,188,878   Lautenschlager et al. _____ Jan. 30, 1940